(12) United States Patent
Aboukarr et al.

(10) Patent No.: US 7,489,684 B2
(45) Date of Patent: Feb. 10, 2009

(54) ACCESS NETWORK ARCHITECTURE FOR MULTICASTING USING XDSL AND IGMP

(75) Inventors: Bakri Aboukarr, Kanata (CA); Dat Ba Nguyen, Ottawa (CA); Allan Leslie Poulsen, Kanata (CA)

(73) Assignee: Alcatel Lucent, Paris (FR)

( * ) Notice: Subject to any disclaimer, the term of this patent is extended or adjusted under 35 U.S.C. 154(b) by 863 days.

(21) Appl. No.: 11/006,558

(22) Filed: Dec. 8, 2004

(65) Prior Publication Data

US 2006/0120368 A1 Jun. 8, 2006

(51) Int. Cl.
 H04L 12/56 (2006.01)
(52) U.S. Cl. ............... 370/390; 370/392; 370/401; 370/432
(58) Field of Classification Search ............... None
 See application file for complete search history.

(56) References Cited

U.S. PATENT DOCUMENTS

| | | | |
|---|---|---|---|
| 6,654,371 B1 | 11/2003 | Dunstan | |
| 6,931,005 B1* | 8/2005 | Wilhelm | 370/390 |
| 2002/0010818 A1* | 1/2002 | Wei et al. | 710/62 |
| 2002/0097728 A1* | 7/2002 | Hinderks et al. | 370/395.52 |
| 2002/0191631 A1 | 12/2002 | Couty | |
| 2003/0145102 A1 | 7/2003 | Keller-Tuberg | |
| 2004/0088735 A1* | 5/2004 | Kristofek | 725/118 |
| 2004/0090970 A1* | 5/2004 | Sanchez et al. | 370/397 |
| 2004/0202199 A1* | 10/2004 | Fischer et al. | 370/474 |
| 2005/0175085 A1* | 8/2005 | Bergen et al. | 375/240.01 |
| 2006/0045085 A1* | 3/2006 | He | 370/390 |

FOREIGN PATENT DOCUMENTS

| | | |
|---|---|---|
| EP | 1429489 A2 | 6/2004 |
| EP | 1517472 A1 | 3/2005 |

OTHER PUBLICATIONS

Hastings, et al; "Challenges and Opportunities of Delivering IP-Based Residential Television Service"; Nov. 2000; IEEE Communciations Magazine, pp. 86-92.*

Hastings, et al., Challenges and Opportunities of Delivering IP-Based Residential Television Services, Selected Papers for ISS 2000, Nov. 2000, IEEE Communications.

* cited by examiner

*Primary Examiner*—Wing F Chan
*Assistant Examiner*—Robert C Scheibel

(57) ABSTRACT

IGMP is a protocol for managing and controlling multicast of data streams to a plurality of end users connected to a telecommunications network through an access system. A novel implementation of IGMP for multicasting data streams in an xDSL access network system is disclosed. DSLAM (Digital Subscriber Line Asynchronous Multiplexer) or ASAM (ATM Subscriber Access Multiplexer) is used in the access network system and interfaces between the telecommunications network and the plurality of end users. IGMP signals are terminated at LT (Line Termination). A better scalability of the access system can be achieved, resulting in increased numbers of end users.

15 Claims, 4 Drawing Sheets

ACCESS NETWORK ARCHITECTURE FOR MULTICASTING USING XDSL AND IGMP

FIELD OF INVENTION

The invention resides in the field of multicasting data streams to multiple destinations through telecommunications networks. In particular, it is directed to providing Internet Group Management Protocol (IGMP for short) on a Digital Subscriber Loop (DSL for short) access system.

BACKGROUND OF INVENTION

Data is commonly transported through networks in packets, frames or cells; these terms e.g., packets, frames, cells, data streams, packet streams, frame streams and cell streams, are used interchangeably throughout this specification. In multicasting, copies of data from a single source are sent to multiple destinations over a network supporting the Internet protocol (IP for short). IP multicast uses a multicast group destination address which is shared by a group of hosts (end users). A multicast source sends packets to that address and when a multicast router or switch (commonly called as "routing device") receives such a packet (addressed to the multicast address), it replicates and delivers the packet to multiple receiving hosts within an internet routed infrastructure. The multicast router compares the received multicast packets to a multicast forwarding table and sends a copy of the received packets out all the interfaces named in that multicast forwarding table. DSL access systems can be used to deliver multicast data streams from the routing device to a host or a group of hosts. A variety of DSL (xDSL) systems are available, e.g., HDSL (High bit rate DSL), SDSL (Symmetric DSL), RADSL (Rate Adaptive DSL), ADSL (Asymmetric DSL) and VDSL (Very high bit rate DSL).

Internet Group Management Protocol (IGMP) is the preferred signaling protocol used in IP networks supporting multicast communications. IGMP messages are separate from packets used for data transfer. Hosts and routing devices use IGMP messages to report their IP multicast group memberships to any neighboring multicast routing devices. For example, when the host joins or leaves the multicast group, the IGMP message indicating this fact is transmitted to the neighboring routing devices Following U.S. patent documents describe related subject matters.

U.S. Pat. No. 6,654,371 Nov. 25, 2003 Dustan et al describes "Method and Apparatus for Forwarding Multicast Data by Relaying IGMP Group Membership"

U.S. patent application Ser. No. 2002/0097728 published Jul. 25, 2002 Hinderks et al describes "Method and Apparatus for Injection of IP Multicast Content into an ATM DSL Network".

U.S. patent application Ser. No. 2002/0191631 published Dec. 19, 2002 Couty describes "Method of and a System for Lightening the Signaling Load of a Multicast Protocol applied to a Network of Terminals using a Transmission Medium that does not support Mutual Listening between Terminals".

U.S. patent application Ser. No. 2003/0145102 published Jul. 31, 2003 Keller-Tuberg describes "Facilitating Improved Reliability of Internet Group Management Protocol through the Use of Acknowledge Messages"

Referring to FIG. 1, a source 30 is injecting a multicast data stream 32 to a network 34 which can be, for example, an ATM network or an IP network. Downstream, a DSL access system, such as a DSLAM 38 (Digital Subscriber Line Asynchronous Multiplexer) delivers the data stream 32 to multiple end users through DSLs 36. Each end user generally has a host computer or a set-top box 40 with a viewing device that is connected to a DSL by way of a CPE 42 (Customer Premise Equipment). In other cases, as shown in FIG. 1, one CPE 44 may interface between a DSL 46 and multiple of end users on a local area network (LAN) 48 of any type e.g., an ATM network, an Ethernet, etc. The CPE includes a DSL modem which bridges the customers system and the DSL.

Referring further to FIG. 1, the DSLAM 38 interfaces between network 34 and CPEs 42, 44. The DSLAM 38 includes an NT (Network Termination) 45 and one or more LTs (Line Termination) 47. The NT manages termination of a point-to-multipoint connection between DSLAM and CPEs. Each LT is essentially a DSL card which manages termination of DSL connections of data streams towards its CPE. A suitable transport medium, such as a bus, switching fabric or point-to-multipoint connections, for example, is provided between NT and LTs.

For the connection over the DSL link 36, ATM has been widely regarded as the communication protocol for use between a DSLAM to a DSL modem. The Alcatel 7300 ASAM (Advanced Services Access Manager) is an example of a DSLAM that employs ATM.

It is noted that while the following description may emphasize the IP multicast over an ATM network, the invention to be described in detail will be equally applicable to other multicasting environment over any DSL access system which may be implemented in other forms of networks, e.g., Ethernet, fiber networks, etc, where virtual circuits or multicast groups can be formed between the host and routing device.

The prior art provides IGMP on a router (IP Server) in an ASAM. The router comprises an IP service module (ISM) and a controller (Network Termination—NT), each being on separate circuit cards. This approach spans two cards. Consequently it is not as efficient as a one-card solution would be. A present Applicant's patent application, Ser. No. 10/878,132 filed on Jun. 8, 2004, describes a solution which uses IGMP termination on the NT for IGMP processing of multicast data streams. This can be called an IGMP on NT architecture. According to the described invention, multicast of the data stream is performed at the ATM level by use of a point-to-multipoint connection, and controlled through IGMP control messages terminating on the NT without usage of the IP Server. This solution is simpler and more efficient than the known systems. It has, however, some performance limitations in that the number of STB (set-top boxes) per NT is limited due to the fact that all the IGMP functions are performed at NT for all the CPEs of the group. Each LT may have many ports, each connected to a CPE (STB) and there are many LTs connected to one NT. As a termination point of IGMP, NT handles all the IGMP control signals for all the connected CPEs. For example, if many end users simultaneously surf video channels, this may overload the NT. Therefore this approach is only appropriate for a very limited video deployment. It is desirable to be able to provide IGMP channel connections in a manner that is scalable.

The invention therefore relates to the problem of providing IGMP services on a DSL access system, such as an DSLAM or ASAM. The invention is applicable equally to the cases where the DSL access system in ATM environment or non ATM environment.

SUMMARY OF INVENTION

The invention resides in the field of integrated IGMP service, particularly to deliver multicast services of data streams to a plurality of end users through a network which uses DSLs. The network can be an ATM network or other type such as Ethernet by the use of DSLs.

An aspect of the invention provides that IGMP signaling can be terminated on LTs preferably for the processing of video channels. This can be called an IGMP on LT architecture (or LT architecture for short). For example, busy functions such as "join/leave" operation are shared by a plurality of LTs without NT's involvement. This will lessen the load on the NT and may result in ease of scaling up the number of end users. It should, however, be noted that both technologies can co-exist in that certain LTs will terminate their IGMP signaling channel on the NT and other LTs will terminate their own IGMP signaling channels.

According to another aspect, the invention also uses a dedicated IGMP signaling VC that can be formed between each LT and CPE. The invention, in this embodiment however, contemplates IGMP termination that is performed at LTs (at each of the DSL cards).

According to still further aspects, the LT architecture can be implemented in an ATM environment or in a non-ATM environment which can be of Ethernet type.

Yet a further aspect, the invention can be achieved by employing a combination of the NT and LT architecture. In such a configuration, certain LTs will terminate their IGMP signaling channel on the NT and other LTs can terminate their own IGMP signaling channels. This would be a hybrid approach. In this hybrid approach, the proportion of LT termination to NT terminations is variable, as determined by scalability requirements of each specific deployment.

In accordance with another aspect, the invention includes a system for providing multicasted communication services on IGMP channel connections. The invention is distinguished over the prior art in that it is capable of terminating IGMP channel connections on line termination (LT) subsystems of the system (i.e. it can use a distributed termination approach for all, or some, of its IGMP channel connections).

According to the method of the invention, the xDSL access system initiates an ATM point-to-multipoint connection with a source connected to the ATM network responsive to an IGMP control message received from one of the end user systems requesting a particular data stream. The source formats data from the particular data stream into IP packets, each IP packet having an IP multicast address. These IP packets are first encapsulated into Ethernet frames and then the source ATM encapsulates the Ethernet frames into ATM cells and launches the cells into the ATM network on the ATM point-to-multipoint connection. The xDSL access system receives the ATM cells over the ATM point-to-multipoint connection and transmits the cells in an xDSL modulated signal to the end user system. An xDSL modem connected between the xDSL access system and the end user system receives the xDSL modulated signal, reassembles the Ethernet frames from the ATM cells and sends the frames to the end user system; and then the end user system receives the IP packets encapsulated in the Ethernet frames and re-formats them into a particular data stream. In this context, the invention is characterised in that the multicasting is performed at the ATM level using a point-to-multipoint connection and controlled through the IGMP control messages which are terminated on the LT (of the xDSL system).

According to another aspect, the invention is directed to a method for providing multicasted data streams to end user systems connected to a telecommunications network by means of a digital subscriber line (xDSL) access system having a NT module and one or more LT modules. The method includes steps of multicasting said data streams using point-to-multipoint connection and controlling said multicasting through internet group management protocol (IGMP) control messages terminated at one or more of the LT modules of the xDSL access system and in the absence of an internet protocol (IP) server.

In accordance with a further aspect, the invention is directed to a method for providing multicasted video data streams to end user systems connected to an asynchronous transfer mode (ATM) network by means of a digital subscriber line (xDSL) access system having an NT module and one or more LT modules. The method includes steps of multicasting said data streams at said ATM network level using a point-to-multipoint connection and controlling said multicasting through internet group management protocol (IGMP) control messages terminated at one or more LT modules of the xDSL access system and in the absence of an internet protocol (IP) server.

The xDSL system may further include an IGMP management entity for controlling the line termination modules to exchange IGMP messages with end users and controlling IGMP multicast functions, i.e., join and leave processing, on the multicast connections in response to the IGMP messages.

DETAILED DESCRIPTION OF EMBODIMENTS

Figure 1:
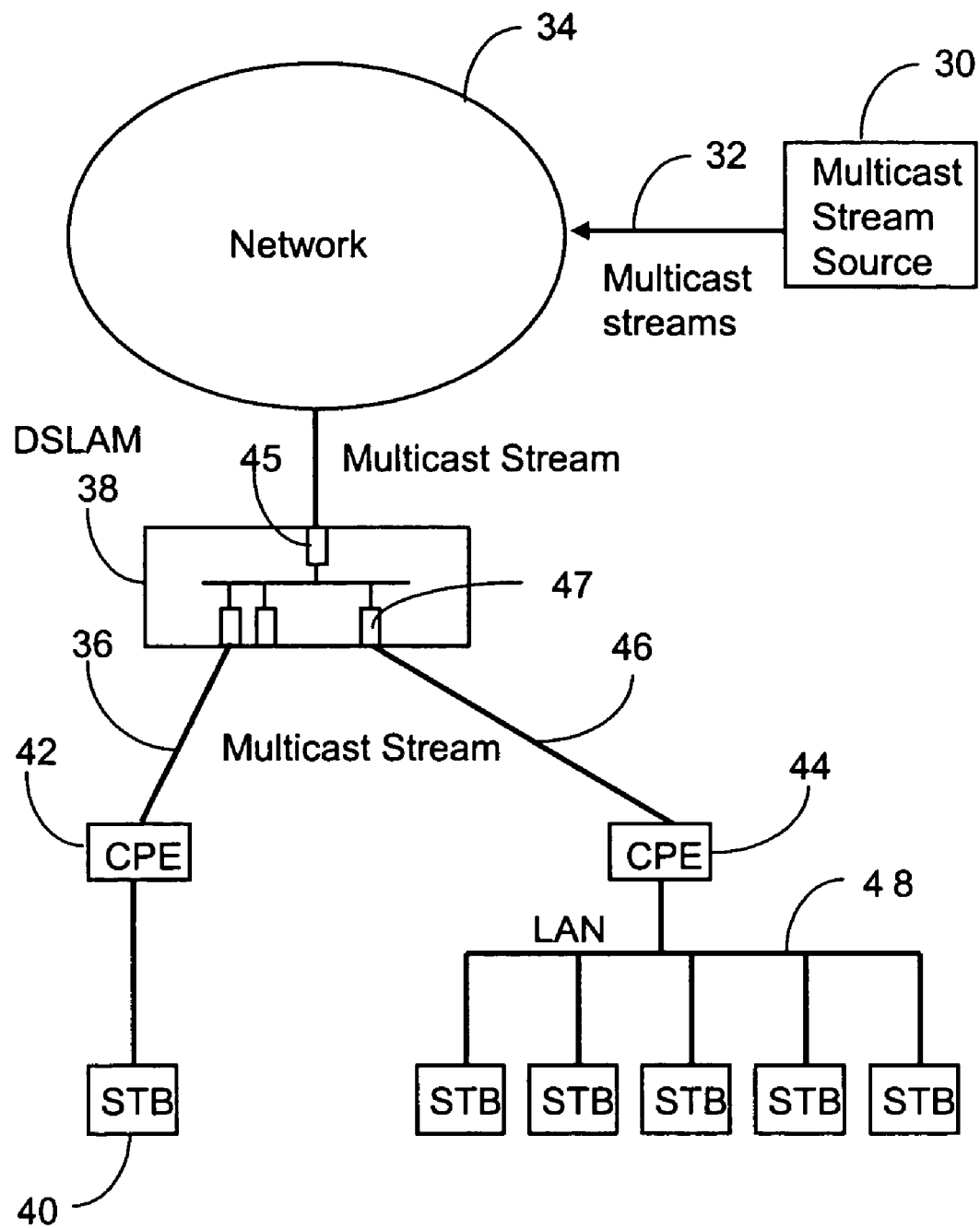
FIG. 1 is a schematic illustration of delivery of multicast streams to a plurality of end users where IGMP is used in conjunction with the use of DSLAM and DSLs.
Figure 2:
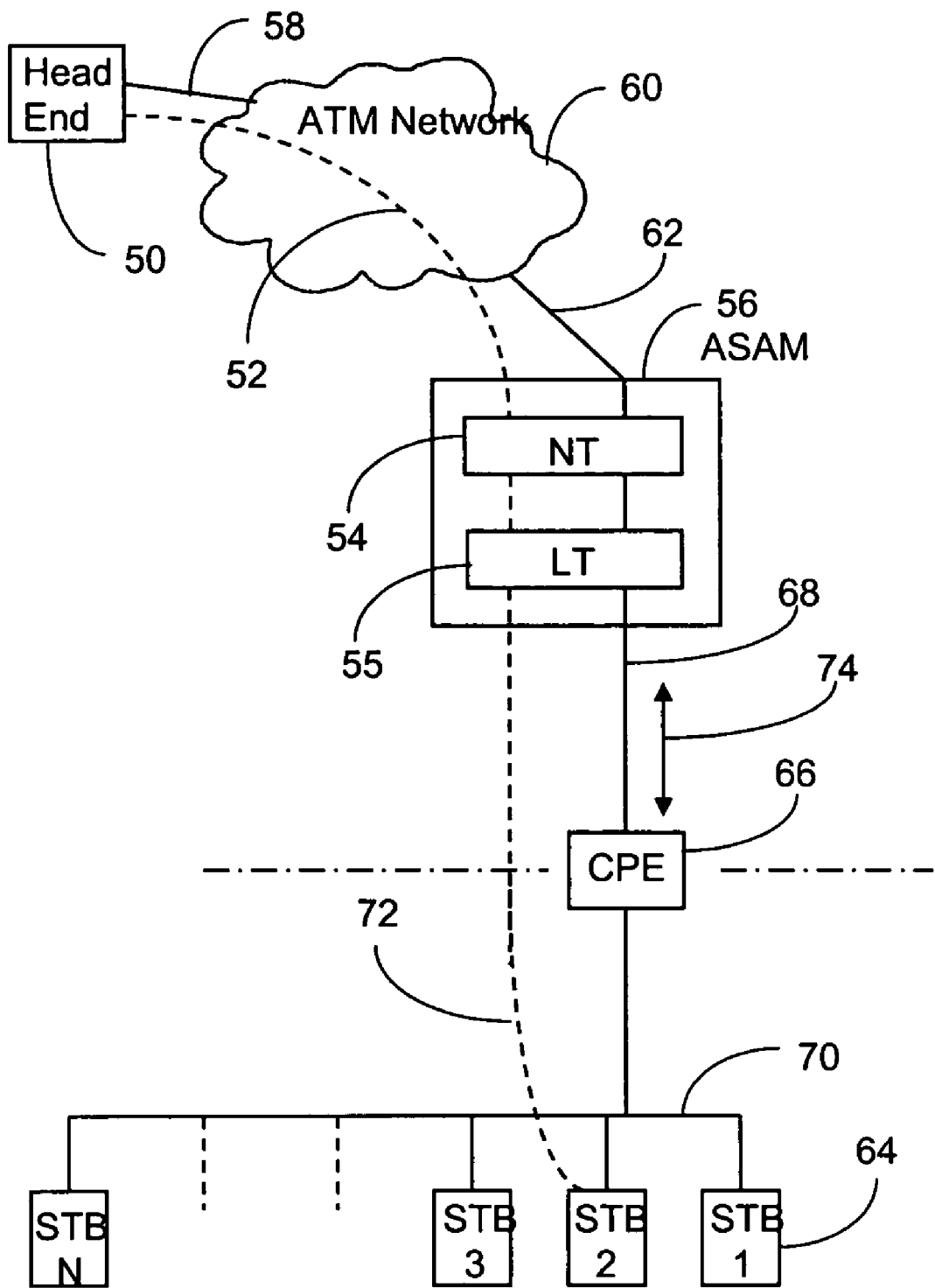
FIG. 2 is a schematic illustration delivery of multicast streams to a plurality of end users where IGMP is used in conjunction with the use of ASAM and DSLs in an ATM network.

According to one embodiment of the invention, an ASAM (ATM Subscriber Access Multiplexer) is used to deliver IP multicast data streams through an ATM network to a group of end users connected to ASAM. ASAM combines functionality of DSLAM (delivery of multicast data streams) and IGMP processing (IGMP termination). ASAM dispenses the use of an "IP-Server", e.g., router. FIG. 2 illustrates schematically an ATM environment in which IGMP is implemented using DSL and ASAM for delivering and managing multicasting data streams to group membership. The figure shows a connection to one CPE.

Referring to FIG. 2, a source (data stream head end) 50 provides statically configured channels 52 (shown in dotted line) to NT 54 in ASAM 56. The source 50, therefore, sends out data streams 58 to an ATM network 60 which delivers them to ASAM 56 through an interface 62. The above assumes that the data streams in interface 62 going into ASAM are properly formatted in the correct IP Multicast Address and ATM encapsulation. The data streams therefore are formatted by the source prior to be injected into the ATM network. Alternatively, they can be formatted at somewhere else along the transport path. ASAM 56 therefore receives properly encapsulated IP multicast streams on interface 62. The data streams are cross connected through a transport medium such as a bus to a plurality of LTs 55, (only one is shown). A plurality of end users (set-top-boxes) 64 are connected to LT 55 in ASAM 56 through a CPE 66 by way of DSL 68 and LAN 70. The data stream connection 72 (shown in dotted line), therefore, is made between ASAM 56 and each end user 64, wherein the connection over DSL 68 is in ATM and that over LAN 70 is IP over Ethernet. In one example, the source and ASAM are managed on the ATM layer for all the ATM functions including such connection as "a point-to-point" or "a point-to-multipoint". The invention uses IGMP between the end users and the ASAM for group management of multicasting. IGMP control signals 74 are exchanged between the ASAM and end users' CPE 66 so that the multicast data streams are properly transported to an appropriate end user.

Figure 3:
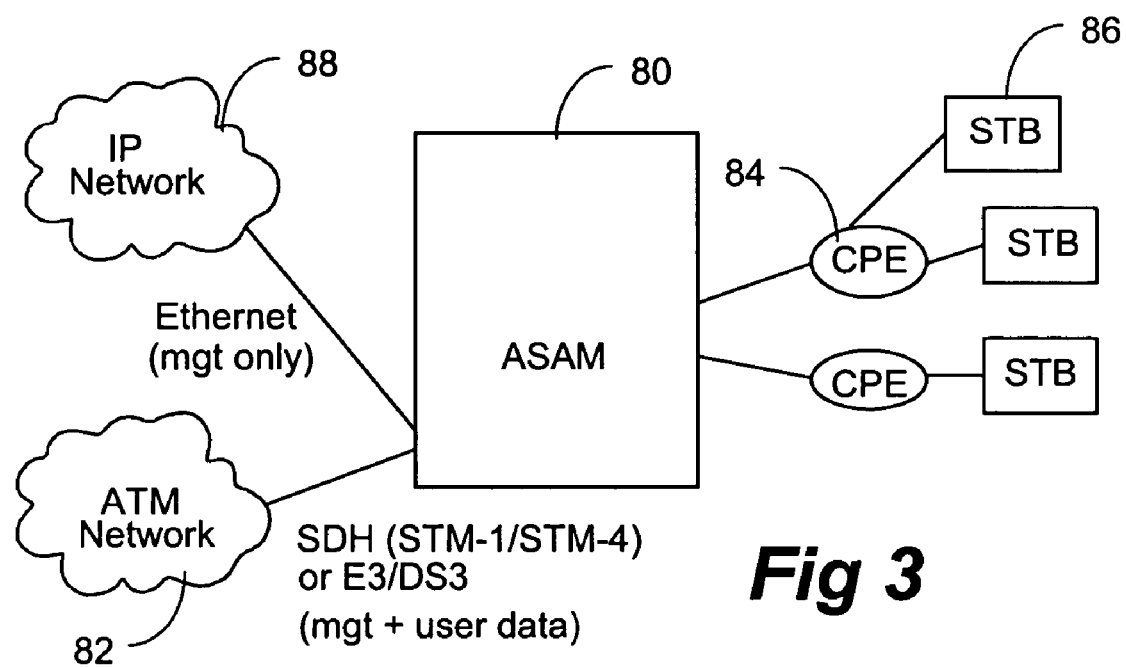
FIG. 3 shows how an ASAM interfaces with external elements within networks.

FIG. 3 illustrates the ASAM external interfaces. Referring to the Figure, ASAM 80 may receive ATM connections from an ATM network 82. ATM network typically communicates with ASAM through an SDH interface for management signal exchange and data transfer. The management interface statically configures the IGMP signaling channels and the multicast IGMP tables. The interface between ASAM 80 and the CPE 84 carries the IGMP signaling information and the video channels that have been subscribed to. The user data interfaces are often SONET/SDH because the broadcast TV channels require bandwidth per channel in the order of 3 Mbps. End users 86 receive data stream, e.g., video streams in a video channel, through their locally located CPEs 84 and end users' STB (set-top-box) 86. A STB is attached to a display device e.g., a TV, to send the content of the stream for display and at the same time to interact with a remote control unit to respond to customer's commands. It is also possible to manage ASAM remotely by exchanging management signals through Ethernet interface and IP network 88.

Figure 4:
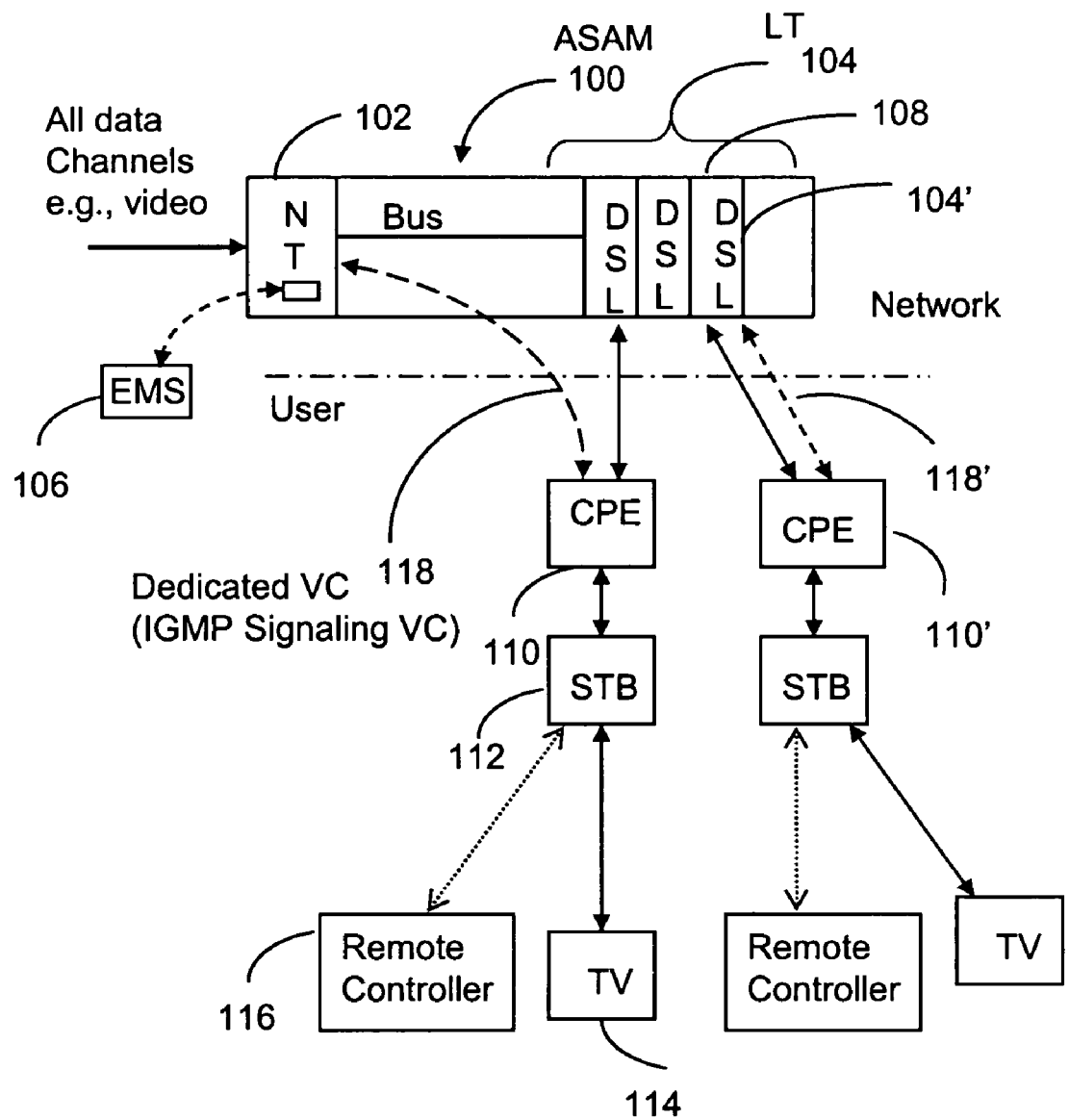
FIG. 4 is a schematic illustration of a construction of an ASAM in accordance with an embodiment of the invention.

Referring now to FIG. 4, an ASAM 100 typically comprises an NT module 102 and a plurality of LT modules 104, in addition to other associated functional modules, e.g., an EMS (Element Management System) 106 supporting management related functions for the ASAM. A transport medium, such as a system bus of a sufficient bandwidth, connects the NT and LTs modules. Each LT module includes a DSL card 108 (or Line Interface Module or LIM for short), which generally have up to a maximum number of ports, e.g., 96, each port being hard-wired to a respective customer's CPE 110 for delivering selected multicast data streams as well as exchanging IGMP message signals. A STB 112 connects CPE 110 and a TV 114 for display. In place of the STB and TV, a PC can be used for display and interaction with a user. A handheld controller 116 such as a remoter controller interacts with STB 112 for user inputs. Data multicast is performed on the ATM level by the use of a point-to-multipoint connection. IGMP is used between ASAM and CPE to control the group multicasting through a dedicated IGMP signaling VC (virtual circuit) provided on the DSL between ASAM and each CPE. Unlike multicasting in the router environment, the NT 102 does not perform IP multicast routing such as DVMRP/PIM (Distance Vector Multicast Routing Protocol/Protocol Independent Multicast), etc.

IGMP is implemented in the ATM DSL environment on the ASAM. NT 102 at ASAM 100 is configured with the addresses of the source of the multicast streams. On the upstream, the NT terminates certain IGMP control channels from each service subscriber and uses the IGMP control messages, such as, join and leave to initiate and terminate cross-connections with corresponding ATM point-to-multipoint connections. These IGMP control channels are shown by a dotted line 118 as a dedicated VC between CPE and NT. At the subscriber premises, the CPE 110 includes an xDSL modem which terminates the ATM point-to-multipoint flows and bridges the ATM packets onto the end user's Ethernet LAN. Once on the LAN, the end user's PC or STB receives the multicast flows and an application on either of these devices presents the video as appropriate.

According to an embodiment of the invention, IGMP channels are terminated on LTs for certain IGMP functions, including join and leave functions, which require quick reaction in response to user inputs. Referring back to FIG. 4, in addition to IGMP protocol at NT 102, IGMP protocol functionality can be supported at one or more LTs 104' (e.g. individual DSL cards 108); an IGMP state machine is provided and run at each such LT. Each LT 104' has an IGMP signaling channel (e.g. dedicated VC) 118' to its corresponding CPE 110'. Moreover, each LT 104' maintains an IP multicast source table similar to the NT 102. The IP multicast source table provides a mapping or translation between IP multicast addresses and respective internal (ASAM) interfaces for the network connections carrying video channels corresponding to the multicast addresses. EMS 106 may configure the IP multicast source table on the NT 102 and LTs 104'. Alternatively, the NT 102 may provide the IP multicast source table to the LTs 104'.

In operation, ASAM 100 receives properly encapsulated IP multicast data streams, carried on point to multipoint connections assuming ATM is the transport network, through one or more network interface at the NT 102. The multicast data steams may be video channels, for example. Each of these IP multicast streams can be provided by the NT 102 through a corresponding internal interface, cross connected via an internal transport medium, to any of the LTs 104'. The transport medium can be, for example, a bus over which the cross connections between the NT 102 and LTs 104' can be established. When an IGMP join message is received by an LT 104' from its associated CPE 110' via their signaling channel 118', a lookup operation is performed for the multicast address from the join message in the IP multicast source table. The IP multicast source table provides the identifier of the internal interface corresponding to the multicast address. The LT 104' then initiates a cross connection to the internal interface whereby the corresponding IP multicast stream is received from the NT 102 over the bus. When the LT 104' receives a leave message identifying the same multicast address, the LT tears down the cross connection.

In general, an advantage of the present invention is to alleviate the workload on the NT 102. Furthermore, it is more scalable than the centralized approach in which only the NT 102 supports IGMP functionality. The IGMP on LT model is therefore a cost-effective solution for providing IGMP channel connections, which are useful for applications such as providing broadcast television over DSL services. One variant of the invention is to provide IGMP processing of join and leave messages on the LT 104' instead of the NT 102. Alternatively, in the hybrid approach, IGMP channels can be terminated on the NT 102 for some LTs 104, and other LTs 104' terminate their own IGMP channels. In this last model, a selected subset of LTs 104' is provided with IGMP state machines.

The invention claimed is:

1. A method for providing multicasted data streams from multicast sources connected to a broadband network to end user systems connected to the broadband network by a digital subscriber line (xDSL) access system having a network termination (NT) module connected to the broadband network, a bus and a plurality of line termination (LT) modules connected to the NT module through the bus, each of said LT modules having a DSL line connected to at least one of the end user systems and having a controller, comprising steps of:

storing a multicast source table in each of the LT modules, each of the multicast source tables storing a plurality of IP source addresses;

transmitting an Internet Group Management Protocol (IGMP) join message from an end user system to one of the LT modules, the transmitting including terminating the IGMP join message at the LT module;

retrieving an IP source address from the multicast source table of said LT module, based on the received IGMP join message;

initiating, at the controller of said LT module, a cross-connection from the LT module to the NT module, through said bus, in accordance with the retrieved IP source address; and multicasting said data streams at said ATM network level, through the cross-connection, using point-to-multipoint connection wherein said multicasting includes controlling the multicast at the controller of the LT module in accordance with the IGMP control messages terminated at the LT module.

2. The method of claim 1 wherein one of the multicast sources formats data the data streams into IP packets, said IP packets having an IP multicast address.

3. The method of claim 2 further comprising storing a multicast source table in the NT module and wherein said storing a multicast source table in each of the LT modules includes the NT module providing the IP multicast source table to each LT module.

4. The method of claim 3 further comprising:

transmitting an IGMP leave message from an end user system to one of the LT modules, the transmitting an IGMP leave message including terminating the IGMP leave message at the LT module at said LT module; and deleting, at the controller of said LT module, a cross-connection from the LT module to the NT module through said bus, in accordance with the IGMP leave message.

5. A method for providing multicasted data streams from multicast sources to end user systems through an asynchronous transfer mode (ATM) network by a digital subscriber line (xDSL) access system having a network termination (NT) module connected to the ATM network, a bus and a plurality of line termination (LT) modules connected to the NT module through the bus, each of said LT modules having a DSL line connected to at least one of the end user systems and having a controller, comprising steps of:

storing a multicast source table in each of the LT modules, each of the multicast source tables storing a plurality of IP source addresses;

transmitting an Internet Group Management Protocol (IGMP) join message from an end user system to one of the LT modules, the transmitting including terminating the IGMP join message at the LT module;

retrieving an IP source address from the multicast source table of said LT module, based on the received IGMP join message;

initiating, at the controller of said LT module, a cross-connection from the LT module to the NT module, through said bus, in accordance with the retrieved IP source address; and multicasting said data streams at said ATM network level, through the cross-connection, using point-to-multipoint connections wherein said multicasting includes controlling the multicast at the controller of the LT module in accordance with the IGMP control messages terminated at the LT module.

6. The method of claim 5 further comprising formatting, by one of the multicast sources, data of the data streams into IP packets, said IP packets having an IP multicast address.

7. The method of claim 6 further comprising encapsulating said IP packets into Ethernet framed IP packets and encapsulating the Ethernet framed IP packets into ATM cells, and wherein the ATM cells are carried over said ATM network on the point-to-multipoint connection.

8. The method of claim 7 further comprising said xDSL access system receiving the ATM network cells over said ATM network point-to-multipoint connection, the xDSL access system converting the ATM network cells to an xDSL modulated signal and transmitting the xDSL modulated signal to said user system.

9. The method of claim 8 wherein an xDSL modem is connected between the xDSL access system and said end user system and further comprising the xDSL modem receiving the xDSL modulated signal, extracting the ATM cells from the xDSL modulated signal, reassembling the Ethernet framed IP packets from the ATM cells and sending the frames to the end user system, and said end user system receiving the IP packets and reformatting the received IP packets into a data stream.

10. The method of claim 9 further comprising storing a multicast source table in the NT module and wherein said storing a multicast source table in each of the LT modules includes the NT module providing the IP multicast source table to each LT module.

11. The method of claim 3 further comprising:

transmitting an IGMP leave message from an end user system to one of the LT modules, the transmitting including terminating said IGMP leave message at said LT module; and tearing down, at the controller of said LT module, a cross-connection from the LT module to the NT module through said bus, in accordance with the IGMP leave message.

12. A method for providing multicasted video data streams to end user systems connected to an asynchronous transfer mode (ATM) network by a digital subscriber line (xDSL) access system having a network termination (NT) module connected to the ATM network, a bus and a plurality of line termination (LT) modules connected to the NT module through the bus, each of said LT modules having a DSL line connected to at least one of the end user systems and having a controller, comprising steps of:

storing a multicast source table in the NT module;

storing a multicast source table in at least one of the LT modules, the multicast source table storing a plurality of IP source addresses;

transmitting an Internet Group Management Protocol (IGMP) join message from an end user system to at least one of the LT modules storing the multicast source table, the transmitting including terminating the IGMP join message at said LT module;

transmitting an Internet Group Management Protocol (IGMP) join message from an end user system to the NT module, the transmitting including terminating the IGMP join message at said NT module;

retrieving an IP source address from the multicast source table of said LT module, based on the received IGMP join message;

initiating, at the controller of said LT module, a cross-connection from the LT module to the NT module, through said bus, in accordance with the retrieved IP source address; and multicasting said data streams at said ATM network level according to a point-to-multipoint connection to at least one the LT modules in accordance with the cross-connection controlled by said LT module, wherein said multicasting includes controlling said multicasting at the controller of said LT module in accordance with the IGMP control messages terminated at said LT module for point-to-multipoint connections to at least one of the end users, and controlling said multicasting at the NT module in accordance with the IGMP control messages terminated at the NT module for point-to-multipoint connections to at least one of the end users.

13. In a network access system in which a plurality of end users access a telecommunications network by an xDSL system having a network termination (NT) module and one or more line termination (LT) modules, a method of multicasting one or more data streams to one or more end users, comprising steps of:

receiving the one or more data streams at the NT module of the xDSL system; and processing Internet Group Management Protocol (IGMP) messages concerning multicast functions on the data streams from the end users at the corresponding LT module, whereby a cross connection between a particular data stream at the NT module and any LT module are setup or torn down responsive to the IGMP message being processed, wherein said processing includes:

storing a multicast source table in each of the LT modules, each of the multicast source tables storing a plurality of IP source addresses;

transmitting an IGMP control message from an end user system to one of the LT modules, the transmitting including terminating the IGMP join message at the LT module;

retrieving an IP source address from the multicast source table of said LT module, based on the received IGMP join message;

controlling, at the controller of said LT module, a cross-connection from the LT module to the NT module, through a bus, in accordance with the retrieved IP source address; and multicasting said data streams at said ATM network level, through the cross-connection, using point-to-multipoint connection, wherein said multicasting includes controlling the multicast at the controller of the LT module in accordance with the IGMP control messages terminated at the LT module.

14. The method of claim 13, wherein the step of transmitting an IGMP control message includes transmitting at least one of a join and leave message and terminating said message at the LT module.

15. The method of claim 14, wherein the step of storing a multicast source table in at least one of the LT modules includes the NT module providing the IP multicast source table to the LT modules.

* * * * *

UNITED STATES PATENT AND TRADEMARK OFFICE
CERTIFICATE OF CORRECTION

PATENT NO. : 7,489,684 B2
APPLICATION NO. : 11/006558
DATED : February 10, 2009
INVENTOR(S) : Bakri Aboukarr et al.

Page 1 of 1

It is certified that error appears in the above-identified patent and that said Letters Patent is hereby corrected as shown below:

Column 7, line 36, delete "at said LT module;"

Signed and Sealed this

Nineteenth Day of May, 2009

JOHN DOLL
*Acting Director of the United States Patent and Trademark Office*